Oct. 20, 1970  M. C. HOPPER  3,535,032
TABLE TOP VIEWER

Filed Oct. 23, 1968  7 Sheets-Sheet 1

Mitchell C. Hopper
INVENTOR

BY

Oct. 20, 1970 M. C. HOPPER 3,535,032
TABLE TOP VIEWER
Filed Oct. 23, 1968 7 Sheets-Sheet 3

Mitchell C. Hopper,
INVENTOR

BY Harry M. Saragovitz
Edward J. Kelly
Herbert Berl
Harold W. Hilton

Mitchell C. Hopper,
INVENTOR

Mitchell C. Hopper, INVENTOR

Oct. 20, 1970  M. C. HOPPER  3,535,032
TABLE TOP VIEWER
Filed Oct. 23, 1968  7 Sheets-Sheet 6

Mitchell C. Hopper,
INVENTOR

Harry M. Saragovitz
Edward J. Kelly
Herbert Berl
Harold W. Hilton

BY

Mitchell C. Hopper, INVENTOR

United States Patent Office 3,535,032
Patented Oct. 20, 1970

3,535,032
TABLE TOP VIEWER
Mitchell C. Hopper, 2003 Suzanne Terrace NW.,
Huntsville, Ala. 35810
Filed Oct. 23, 1968, Ser. No. 769,804
Int. Cl. G03b 21/28, 21/30
U.S. Cl. 353—98                                4 Claims

ABSTRACT OF THE DISCLOSURE

A display system for use in confined spaces for rapidly retrieving micro-images formed on microfiche cards. The system includes a projection system mounted beneath a surface such as a desk or table top which also serves as a screen. The projection system includes an optical and lighting system having the microfiche supported therebetween. The lens is mounted below the table top surface for directing the image through a small opening therein to a reflecting mirror mounted in substantially parallel relation to the surface. The mirror reflects the images back down on the table for focussing thereon. Typically the projected portion of the microfilm is two adjacent spaced frames and the spacing between the frames falls back on the screen or table top in overlapping relation with the small opening in the surface. The frames are positioned on opposite sides of the opening and unobscured thereby. A lens extension protrudes through the opening so that the operator may adjust lens focus from above the table.

The invention described herein may be manufactured, used, and licensed by or for the Government for governmental purposes without the payment to me of any royalty thereon.

BACKGROUND OF THE INVENTION

The present invention provides apparatus for projection of microfiche images on an opaque screen for viewing in an area where space is limited. A microfiche is a film transparency approximately 105 mm. high by 148 mm. wide (National Microfiche Association) which contains a format of 98 frames each 12.5 mm. high by 10 mm. wide. A maximum photographic reduction ratio of 24:1 is used with this format.

Presently there are a number of microfiche viewers available which are capable of displaying two king size pages on a translucent screen using the rear projection method. The screen and the entire projection path is contained in an inclosure which makes the viewer quite bulky and restricts its use only to areas which have ample space to accommodate the extra bulk.

The viewer of the present invention is compact enough for use in areas where space is limited, such as equipment shelters, service vans, battery control trailers as used in missile launching, tanks, aircraft, ships, submarines, and other tactical vehicles requiring the use of maintenance support publications. A complete library of technical manuals can be carried in the vehicle in microfiche form at a volume reduction of about 400:1 as compared to other standard publications.

SUMMARY OF THE INVENTION

The apparatus of the present invention includes a projector mounted below the surface of a table or desk and oriented to project an image through a small hole in the surface straight up to a mirror mounted above the surface in substantially parallel relation thereto. The image projected by the projector is reflected downward to the surface which has been especially prepared as an opaque screen. A hollow tube is mounted on the lens of the projector and extends upward through an opening in the table top to facilitate lens focus from above the table. Adjacent frames from the microfiche will be projected onto the opaque surface with the border between the frames appearing vertically in the center of the screen so that no information will be obscured where the projection hole is located.

It is an object of the present invention to provide an image projection system for use in areas of limited space.

It is a further object of the present invention to provide such a projection system wherein the image is projected from and reflected back to a surface carried directly in front of the viewer and operator.

It is an additional object of the present invention to provide such a projection system wherein adjacent frames of a microfiche are projected from a projector mounted beneath a desk or table surface to a mirror mounted parallel to the surface and reflected back to the desk or table surface to be viewed by personnel sitting at the desk.

It is still a further object of the present invention to provide means for lens adjustment of such a projector from above the table or desk surface through which the image is projected.

These and other objects of the invention will be more readily apparent from the following description and drawings:

DESCRIPTION OF THE PREFERRED EMBODIMENT

Figure 1:
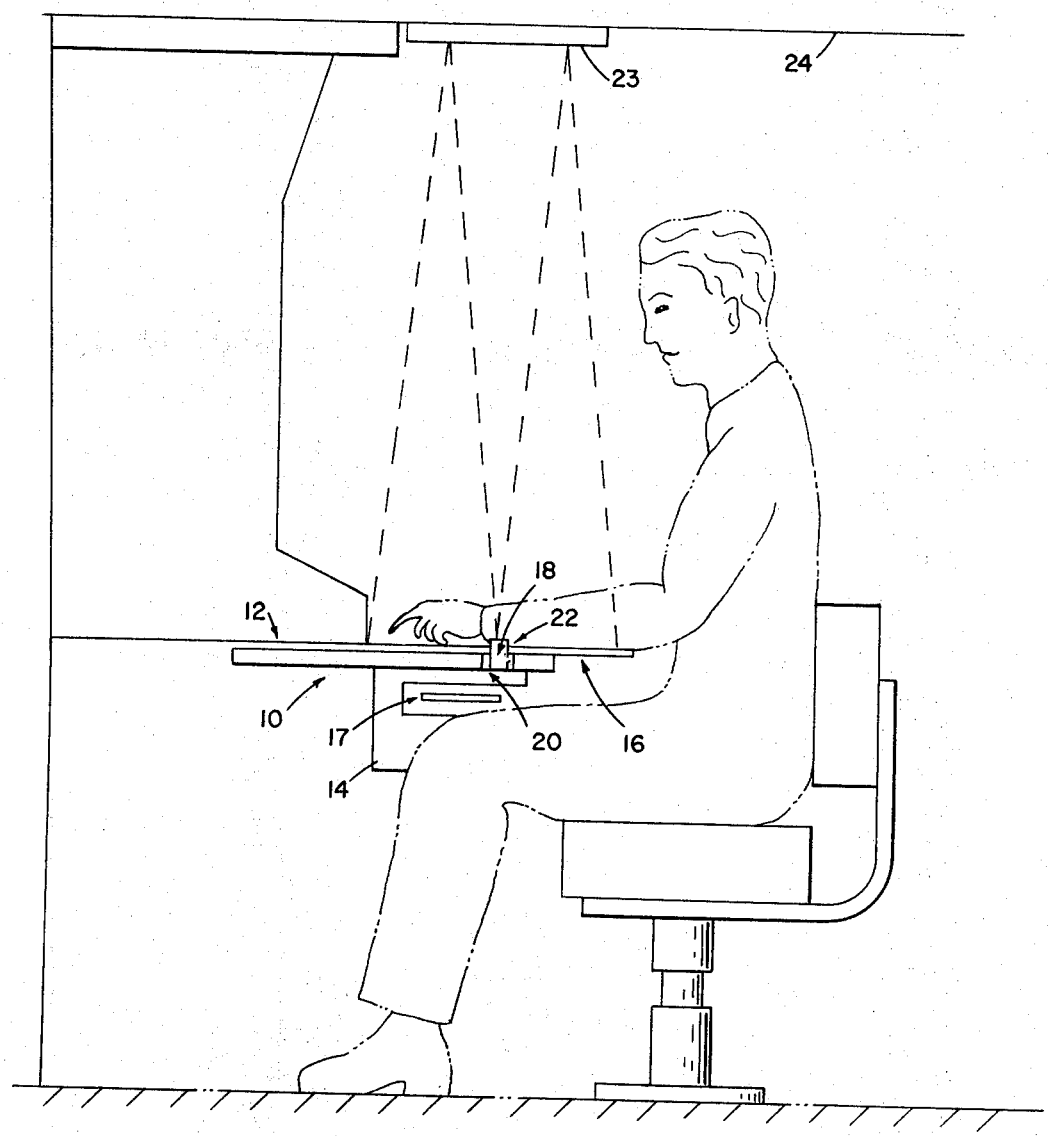
FIG. 1 is a pictorial view of an operator utilizing the device of the present invention.

As shown in FIG. 1 the display system 10 includes a table 12 having a microfiche projection device 14 mounted beneath the table surface 16 for projecting images from a microfiche card 17 positioned in device 14.

Figure 6:
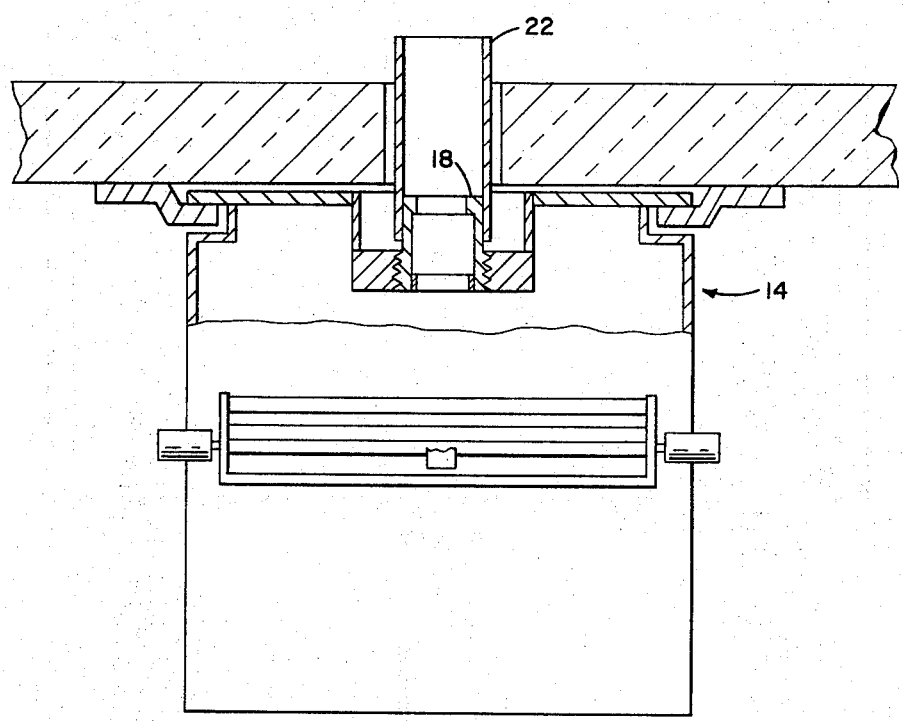
FIG. 6 is an elevational sectional view of the projector mounted beneath the table top surface.

Projection device 14 includes a lens 18 aligned with an opening 20 in table surface 16. A cylindrical member 22 is secured about the lens (FIGS. 2 and 6) and extends through opening 20 so that an operator can adjust the lens focus from above the table. As shown in FIG. 6, the cylindrical member is secured to the lens holder, as by press fit, soldering, or any of many conventional means, so that rotation of the member 22 causes rotation of the lens in the projector.

Figure 2:
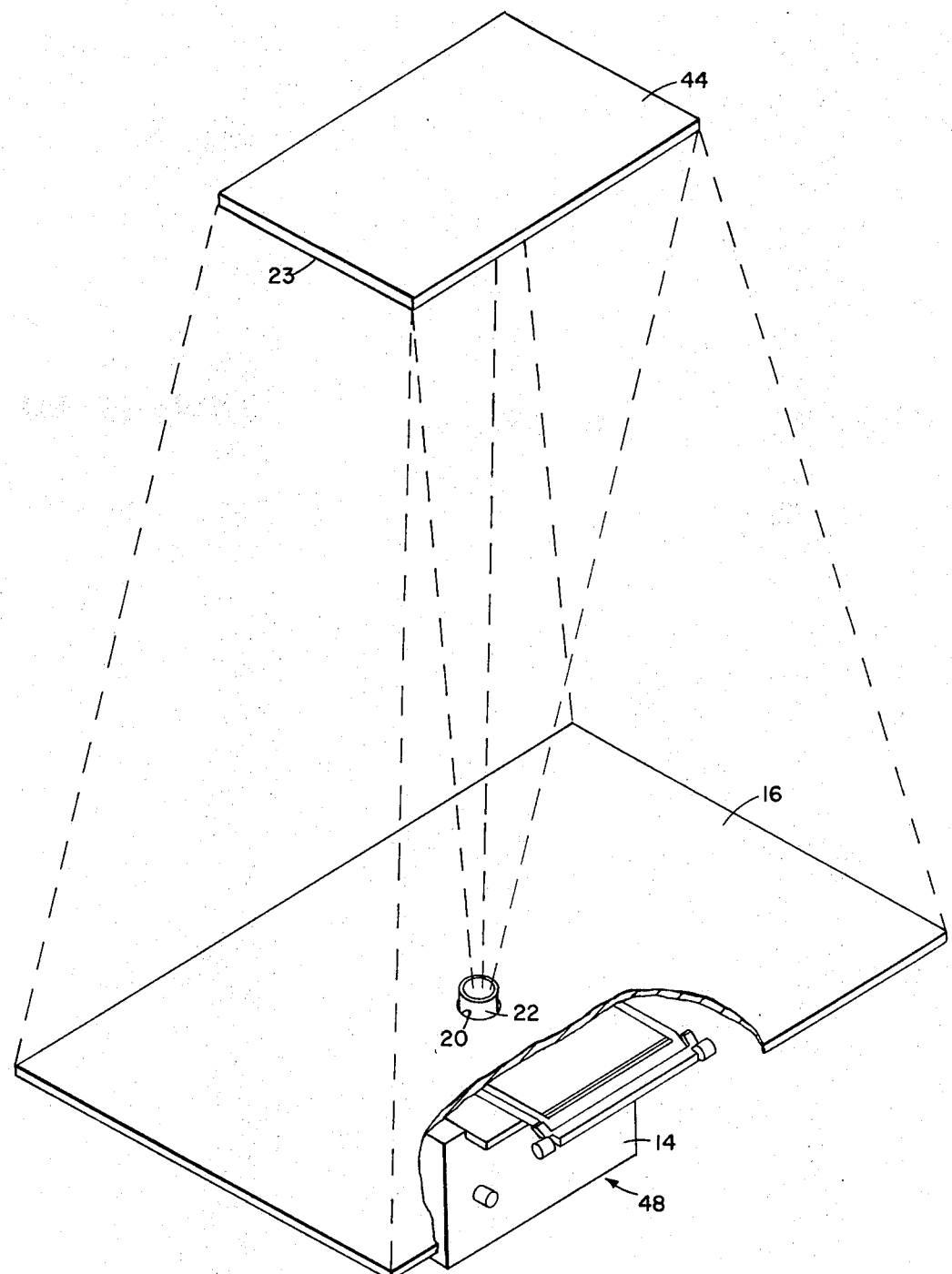
FIG. 2 is a view of the projector, screen, and reflector as disclosed in the present invention.
Figure 3:
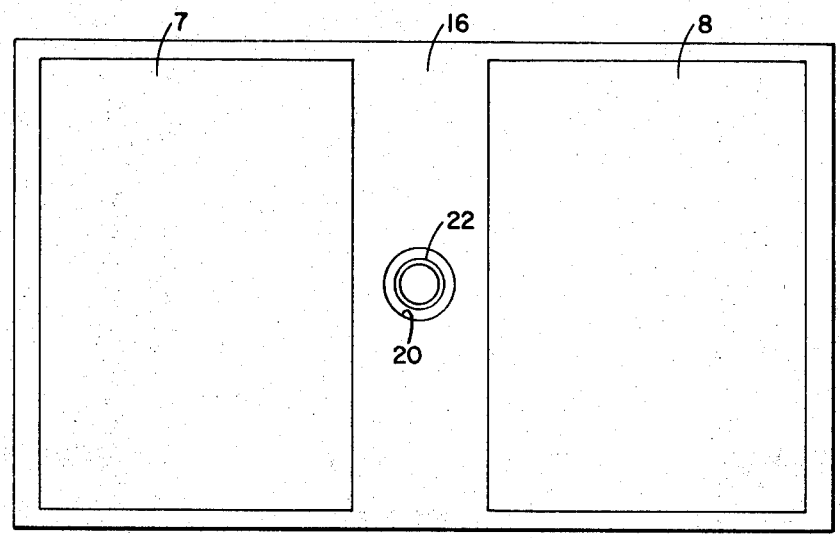
FIG. 3 is a plan view of the table top microfiche view screen 16 showing the image areas 7 and 8 for a projected image from two adjacent frames on the microfiche.

FIGS. 1 and 2 illustrate a reflecting mirror 23 as being mounted on a ceiling 24 in parallel relation with surface 16. The mirror reflects the image back to the surface which has been prepared as an opaque screen. No projected image information is obscured by opening 20 in the table because two adjacent frames on each microfiche are included in the image coverage and each adjacent frame falls on either side of the hole. In other words, between the two frames of information is a border about 3 inches wide at 24× magnification. The projection hole in the table top is located right in the same spot covered by the border.

Figure 4:
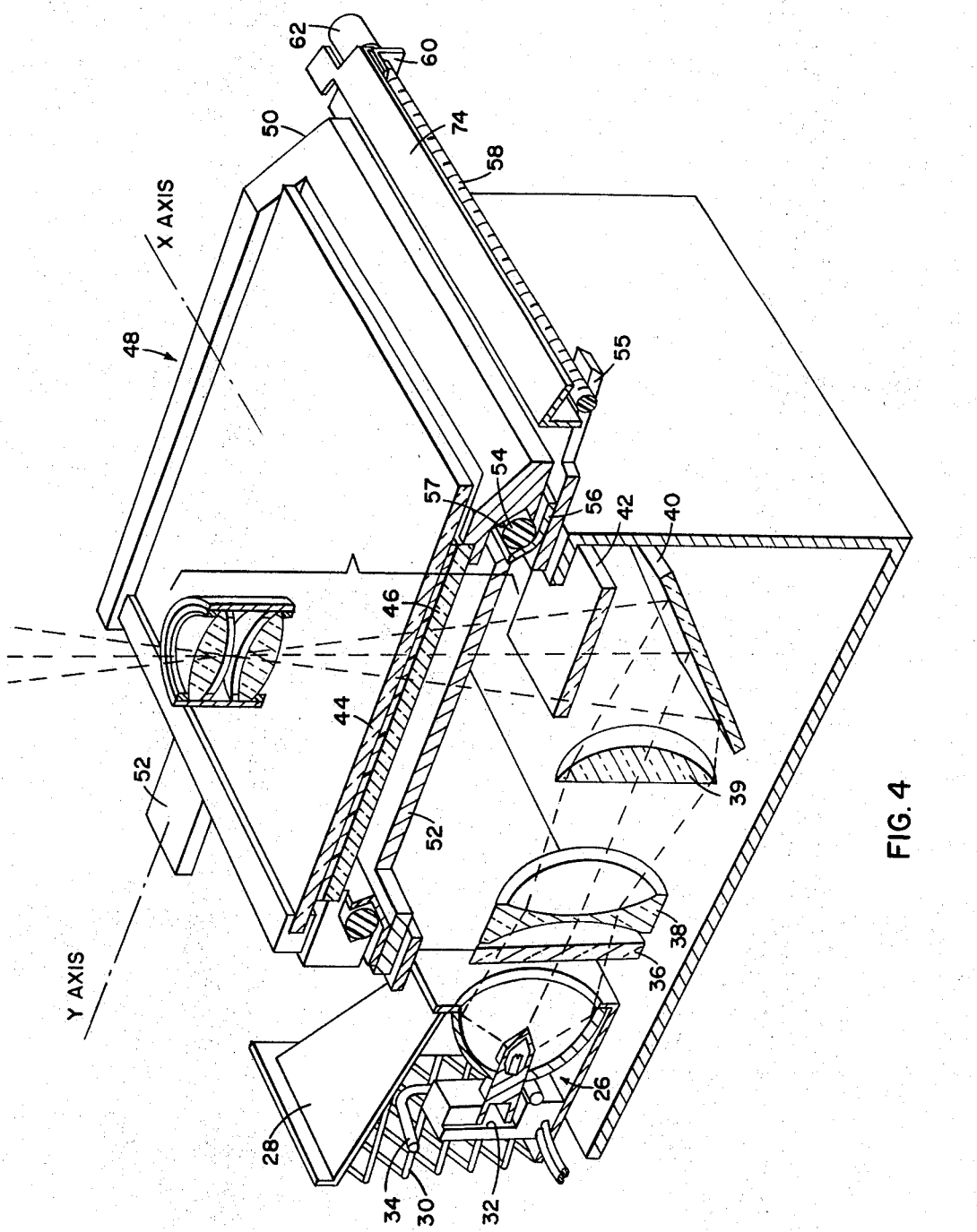
FIG. 4 is a cut-away dimensional view of the viewer of the present invention.

The projection device 14 is provided with a convection cooled light source 26 (FIG. 4). A reflective housing 28 around the projection lamp directs the heat rearwardly through an exhaust grill 30. The projection lamp socket 32 is equipped with a quick remove lever 34 to simplify removal and replacement of the projection lamp.

A ground glass defuser 36 softens the light beam to remove harsh hot and cold spots from the light beam. A negative lens 38 deverges the prefocused beam to fill the secondary condensing lens 39. A right angle mirror 40 redirects the converging light beam vertically through the heat absorbing lens 42. The beam passes through the microfiche 17, which is mounted between a pair of glass plates 44 and 46, and covers two adjacent frames on the microfiche and continues to the projection lens where it converges. The image continues upward to the mirror where it is reflected back down and comes into focus on surface 16.

Projection unit 14 further includes the microfiche handler 48 which is provided with an X-carriage 50 and a Y-carriage 52. The Y-carriage is mounted for in and out movement. Movement in the Y-axis allows selection of any line from the title line at the top of the microfiche to the bottom line on the microfiche card.

X-carriage 50 is supported by teflon rods 54 carried in adjustable guide tracks 56 carried on the Y-carriage. The teflon rods are also positioned in fixed guide tracks 57 formed on the X-carriage. A threaded follower 55 is secured to the Y-carriage and extends therefrom to support a threaded shaft 58 therein. Threaded shaft 58 is secured to the X-carriage by brackets 60 (only one shown). A vernier control knob 62 is secured to one end of shaft 60 and is disposed for rotation by the operator for movement of the X-carriage in a right or left direction, that is, in a direction normal to the direction of movement of the Y-carriage.

Figure 5:
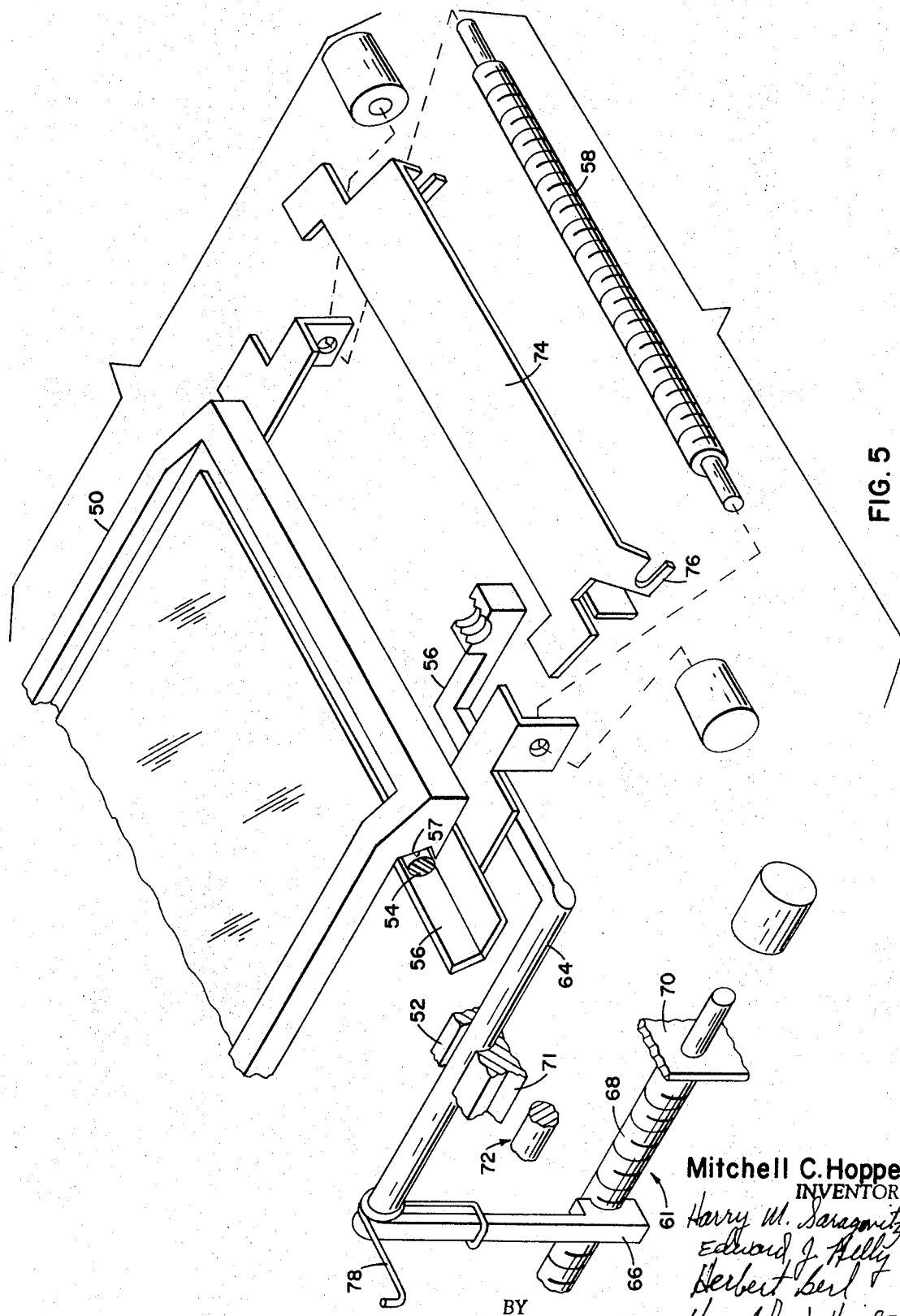
FIG. 5 is an exploded view of the viewer illustrating mechanism for movement of the carriage.

To provide for in and out movement of the Y-carriage, a mechanism 61 (FIG. 5) is provided which is similar to that discussed in conjunction with movement of the X-carriage. Such mechanism includes an arm 64 rigidly secured to and extending from the follower 56. The arm is threaded at its other end 66 for threaded engagement with a second threaded shaft 68 which is mounted on the frame 70 of projection mechanism 14 and extending in a direction normal to shaft 58. Teflon rods 72 (only one shown) are mounted between guide tracks 71 of the Y-carriage and guide tracks (not shown) on the projection device frame, for ease of movement of the Y-carriage, as discussed supra, in conjunction with the X-axis.

Simultaneous vernier override is accomplished by depressing an override lever 74 (FIGS. 4 and 5) secured around shaft 58 by means of a bracket 76, to disengage follower 56 from threaded shaft 58 and permit manual movement of the X-carriage to the approximate area desired.

A return spring 78 is secured to arm 64 and Y-carriage to provide a counter clockwise returning force against arm 64 to return follower 56 and 66 to engagement with threaded shafts 58 and 68, respectively. The image may then be adjusted to its exact desired position by rotating threaded shafts 58 and 68 in the followers.

Figure 7:
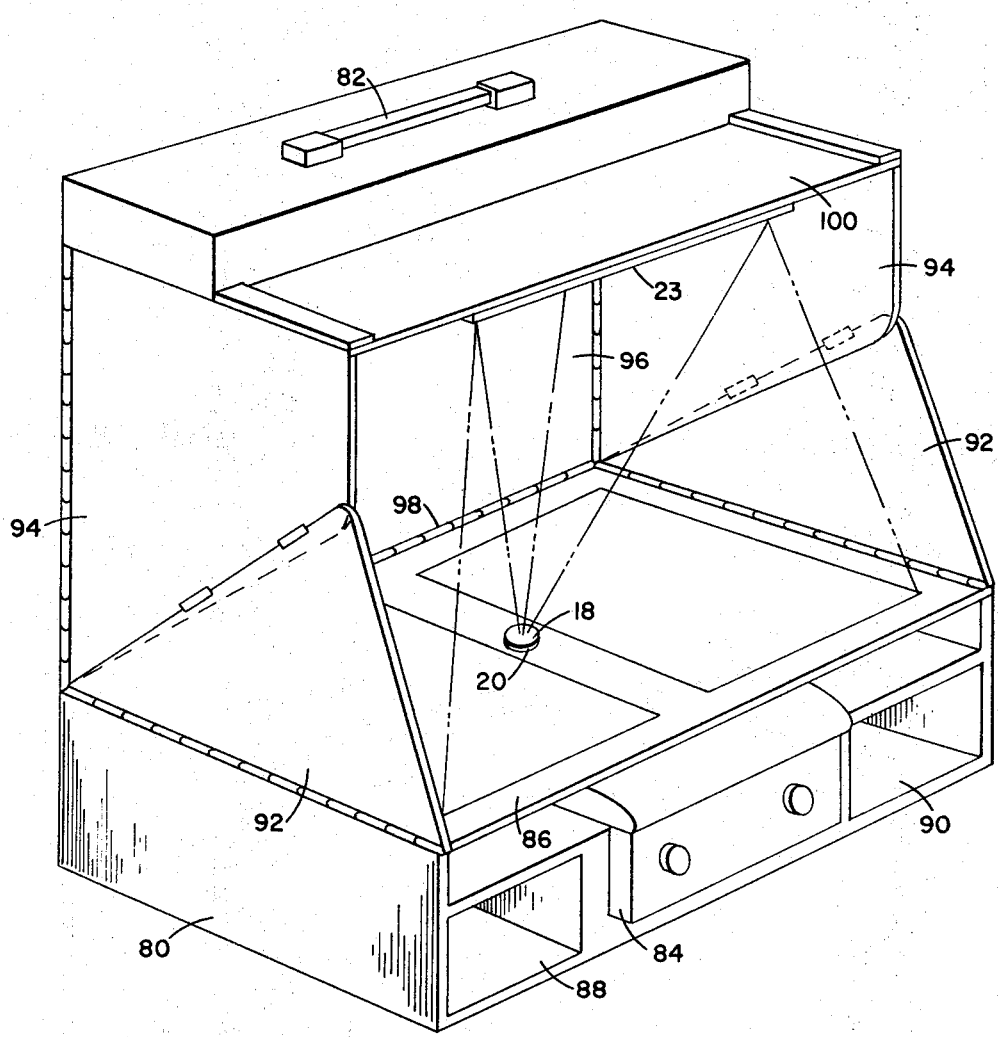
FIG. 7 is a pictorial view of another embodiment of my invention showing a folding display system.

As illustrated in FIG. 7, the device of my invention is incorporated in a foldable case for portability. In this embodiment of my invention like numerals will be used to refer to like parts. As shown in FIG. 7, a foldable case 80 is provided with a handle 82 for transporting the case. The projection unit is mounted in a compartment 84 beneath the screen surface 86 which may form part of the case structure. Lens 18 extends through opening 20 in the manner described supra. Surface 86 has been prepared as an opaque screen surface as described supra. The portable case includes a pair of compartments 88 and 90 for storage of microfiche cards or other materials.

Figure 8:
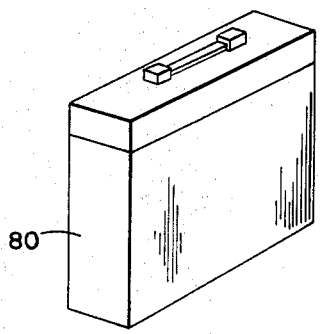
FIG. 8 is a pictorial view of the device illustrated in FIG. 7, in carrying position.

The case is provided with a first pair of flaps 92 secured in hinged relation with surface 86, and a second pair of flaps 94 secured in hinged relation with a back plate 96 which are also hinged to surface 86 by hinges 98. An upper plate 100 is secured in hinged relation to back plate 96 and is disposed for supporting mirror 23 thereon. Responsive to folding the various flaps, the brief case assumes the compact configuration as shown in FIG. 8.

Figure 9:
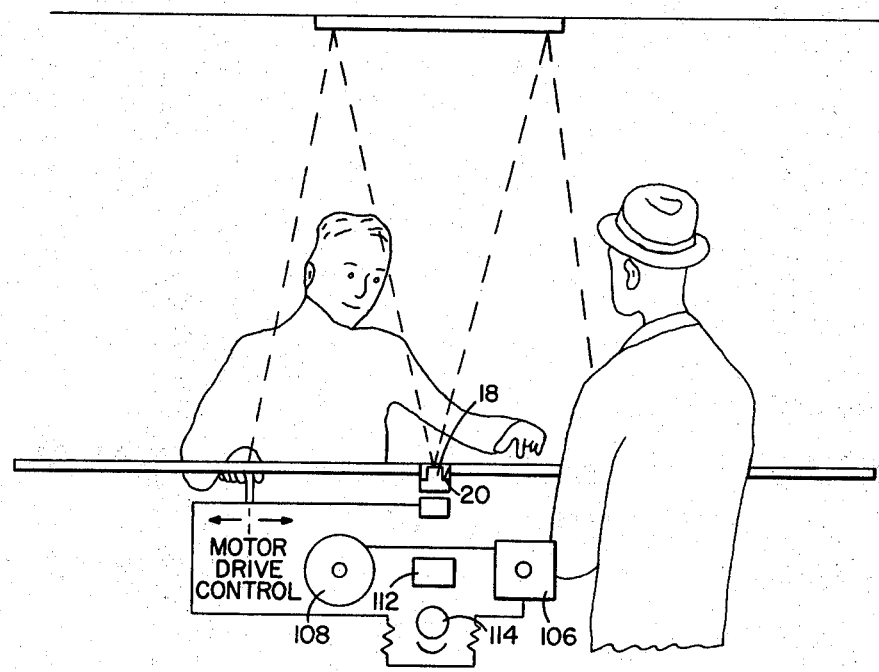
FIG. 9 is a pictorial view of an embodiment of my invention wherein the system is utilized as a catalog display system.

FIG. 9 illustrates another embodiment of the invention wherein the principles of the invention are utilized in a catalog display system. In this embodiment the screen has been prepared on the upper surface of a parts counter and the mirror is mounted on the ceiling substantially parallel to the counter surface. Lens 18 projects through opening 20 in the counter top for ease of operation of the customer. The projection system may utilize a film roll or cartridge 106 connected to a reel 108 which may be operated by a motor drive control 110, in conventional manner. The condenser 112 and lamp 114 of the mechanism is mounted beneath the lens for directing the image through opening 20 to the mirror 23 to be reflected downward to the parts counter for convenient viewing by the customer.

Figure 10:
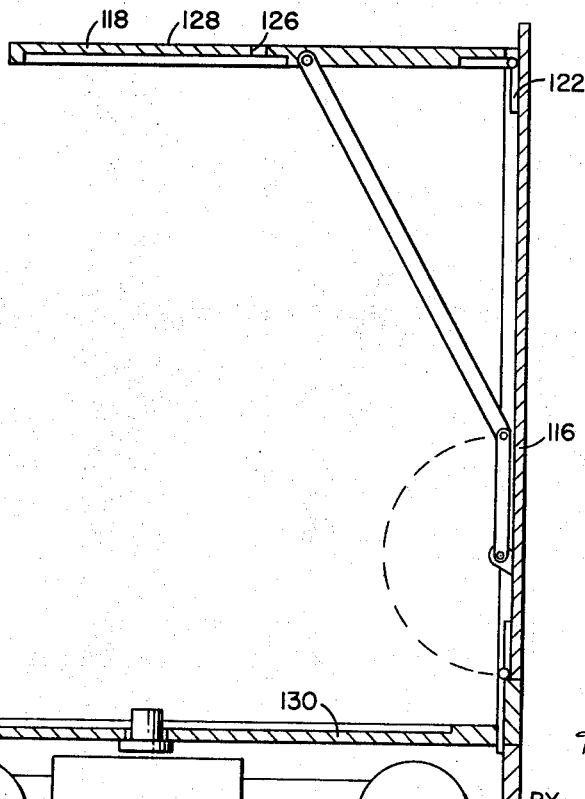
FIG. 10 is an elevational view of the projection system utilizing a folding table top.

As shown in FIG. 10, the parts counter may include a folding counter portion 116 which is provided with a member 118 hinged to the screen portion by a hinge 122. Mirror 23 is secured to member 118. Member 118 is hinged to the folding counter portion 116 by a hinge 122 and folding counter portion 116 is hinged to a counter base assembly 124 by hinge 125.

The member 118 is provided with a recess 126 on the backside 128 thereof to provide a place for seating the lens extending through support member 130 of the table. The projection system utilized in this apparatus is similar to that disclosed in FIG. 9.

Quite obviously many modifications of the present invention may occur to those skilled in the art; however, such modifications are within the spirit and scope of the appended claims.

What is claimed is:
1. A projector viewer comprising:
 (a) a surface having a screen for receiving an image thereon for viewing by an individual, said surface being provided with an opening therethrough, said image including a pair of adjacent frames on a microfiche card;
 (b) projecting means mounted beneath said surface and including a lens extending into said opening for projecting said image beyond said surface in a path substantially normal to said surface;
 (c) reflecting means mounted above said surface in substantially parallel relation therewith, said reflecting means disposed for reflecting each said adjacent frame back to said surface with the spacing between said frames coinciding with said opening in said surface.

2. Apparatus as in claim 1 including a sleeve secured to said lens and extending just above said surface for movement by said individual for adjusting said lens from above said surface.

3. Apparatus as in claim 2 wherein said screen includes an opaque surface disposed in spaced relation on opposite sides of said opening.

4. Apparatus as in claim 3 wherein said projecting means is provided with vernier adjusting means for positioning said image relative to said lens so that said adjacent frames may be precisely positioned on said opaque surface.

References Cited

UNITED STATES PATENTS

| | | | |
|---|---|---|---|
| 1,961,803 | 6/1934 | Trout | 353—79 |
| 3,267,801 | 8/1966 | Abbott et al. | 353—39 |

FOREIGN PATENTS

| | | |
|---|---|---|
| 57,031 | 8/1952 | France. |
| 902,331 | 12/1944 | France. |
| 958,611 | 9/1949 | France. |

HARRY N. HAROIAN, Primary Examiner

U.S. Cl. X.R.

353—27, 39